United States Patent [19]
Blum et al.

[11] Patent Number: 6,029,929
[45] Date of Patent: Feb. 29, 2000

[54] GROUND-EFFECT VEHICLE

[76] Inventors: Albert Blum, Rigistrasse 1, CH-8802 Kirchber; Klaus Blum, Regenbogenweg 1, CH-9400 Roschacherberg, both of Schweiz, Germany

[21] Appl. No.: 08/875,452

[22] PCT Filed: Jan. 30, 1996

[86] PCT No.: PCT/DE96/00127

§ 371 Date: Jul. 29, 1997

§ 102(e) Date: Jul. 29, 1997

[87] PCT Pub. No.: WO96/23686

PCT Pub. Date: Aug. 8, 1996

[30] Foreign Application Priority Data

Jan. 30, 1995 [DE] Germany ............... 195 02 766

[51] Int. Cl.[7] .................................................. B64C 37/02
[52] U.S. Cl. .................. 244/2; 244/23 R; 244/117 R; 180/116
[58] Field of Search ............... 244/2, 23 R, 23 B, 244/23 A, 15, 117 R; 180/116; 114/67 A

[56] References Cited

U.S. PATENT DOCUMENTS

| | | | |
|---|---|---|---|
| 3,762,355 | 10/1973 | Raynes | 114/67 A |
| 3,908,783 | 9/1975 | Joerg et al. | 180/116 |
| 3,918,382 | 11/1975 | Austin | 114/67 A |
| 3,990,658 | 11/1976 | Letsinger | 244/23 R |
| 4,151,893 | 5/1979 | Mantle | 180/116 |
| 5,105,898 | 4/1992 | Bixel, Jr. | 180/117 |
| 5,335,742 | 8/1994 | Blum | 180/117 |
| 5,496,001 | 3/1996 | Skow | 244/119 |
| 5,636,702 | 6/1997 | Kolacny | 244/12.1 |

*Primary Examiner*—J. Woodrow Eldred
*Attorney, Agent, or Firm*—Brooks & Kushman P.C.

[57] ABSTRACT

The invention relates to a ground-effect vehicle for the rapid transport of people and/or freight, with at least one body, a drive train and ground-effect bearing surfaces, a guidance system for directional control and a drive system on the body and/or bearing surface in the form of propeller or fan drives. The aim of the invention is to provide a ground-effect vehicle which is inexpensive to build, avoids the prior art drawbacks in particular and is especially economical to operate. According to the invention, the ground-effect vehicle consists of at least one aircraft fuselage (1), the ground-effect bearing surfaces (2) are secured directly at least to parts of the existing bearing surfaces (6) of the aircraft or at least on the existing spars (12) surrounding them or secured thereto beneath the existing bearing surfaces (6) and that the drive system (4; 15; 16) has means which increase the power and/or reduce friction in the take-off and landing phases.

17 Claims, 9 Drawing Sheets

GROUND-EFFECT VEHICLE

The invention relates to a ground-effect vehicle for the rapid transport of passengers and/or freight, with at least one fuselage, an undercarriage and ground-effect wings, a tail unit for directional control and a drive system in the form of propeller or fan engines located on the fuselage or the wings.

The transport systems familiar to date for the transport of passengers and/or freight display various disadvantages, in particular poor economic efficiency and substantial environmental pollution. Although large ships can be regarded as cost-effective, they are far too slow and thus not able to cope with large transport volumes in a short space of time. Hovercraft are not economical over medium distances and are also too slow. However, hovercraft have the advantage that they can reach almost any stretch of the coastline without requiring prepared harbour facilities.

Hydrofoils can only be used on water and also need a draught, meaning that special preparations have to be made for loading and unloading these boats.

Although commercial airplanes are fast, it must be noted that, owing to the flight altitudes to be reached, they are uneconomical and harmful to the environment because they consume substantial quantities of fuel when climbing, possibly even more than is consumed during the entire remainder of the flight. Consequently, commercial airplanes are not economical when transporting relatively large weights over medium distances.

As regards the ground-effect vehicles which have become known to date, it has also been found that they are expensive to produce and that they have an increased power requirement when taking off. Additionally, operation in connection with water means that the structure must be highly stable because, when taking off from water and landing on water, for example, the entire structure is exposed to very high loads due to the "hardness" of the water. Therefore, the floats and the overall structure have to be designed in such a way that they can cope with the high loads in the water—at high speeds.

A ground-effect vehicle designed for transporting large loads and for a high passenger capacity is known from FR-A-1411219, for example. In an amphibian version, this ground-effect vehicle is virtually designed as an all-wing or single-wing structure in which fuselage-like pontoons are integrated in the ground-effect wing. The ground-effect wing is designed as a slow-speed flight section, where primarily the interior of the ground-effect wing is used as the freight and passenger compartment. A cockpit for the flight crew is provided in a central area of the ground-effect wing. The structure of this ground-effect vehicle is extremely voluminous and complex, not least because of its amphibian design. As a result of its high transport capacity, this vehicle also has an elevated power requirement.

An air-cushion undercarriage for conventional airplanes is known from FR-A-1469450, increasing the uplift during the take-off phase of the airplane. To this end, an air scoop is formed between the wings and the ground by means of flaps hinge-mounted on the wings, this being pressurised by the thrust generators of the airplane, thus producing a so-called static ground effect. A dynamic ground effect, which takes effect under the wings at a low flight altitude as a result of the special section and the angle of attack of the wings, as well as due to compression of the airstream flowing against the wings, i.e. which increases at rising vehicle speeds, cannot be achieved with the undercarriage described in this publication.

A ground-effect vehicle pursuant to the characterising portion of claim 1 is also known from U.S. Pat. No. 4,151,893, for example. In this ground-effect vehicle, the uplift is produced by generation of a dynamic air cushion which only takes effect at a certain travelling speed. The vehicle described there is also an amphibian vehicle. In order to improve the manoeuvrability of this amphibian vehicle at reduced travelling speeds, for example when manoeuvring in ports or the like, U.S. Pat. No. 4,151,893 proposes providing this vehicle with additional means for generating a static ground effect. The vehicle described there is a combination of a hovercraft or air-cushion vehicle and a ground-effect vehicle. This vehicle is exclusively for use on water.

The invention is therefore based on the task of providing a ground-effect vehicle which can be produced at low cost and operated particularly economically while maintaining a high degree of operating safety.

The task on which the invention is based is solved by the characterising features of claim 1.

Further advantageous configurations of the invention are indicated in the sub-claims.

The solution according to the invention permits the production of particularly inexpensive ground-effect vehicles, in which major assemblies, such as aircraft fuselage, wing sections, hydraulic and control system components, undercarriage gear, etc., can be reutilised. This additionally yields a particularly favourable possibility for recycling old airplanes.

As indicated in the claims, either just one fuselage or two aircraft fuselages can be used. The latter can be joined together in the manner of a catamaran. In this case, the connecting wing element likewise consists of a ground-effect wing section. The catamaran-style construction achieves static and dynamic stability of the ground-effect vehicle. In combination with the elevator, the new wing section—which is specifically designed for slow-speed flight—achieves absolutely reliable altitude and pitch stability.

The particularly inexpensive solution is achieved through the reutilisation of the valuable components, such as wings, fuselage, etc., and their existing statical structure, the new wing section being adapted to slow-speed flight with ground effect. It must be ensured that the new section lends the existing spars the same statical data during slow-speed flight as those existing with the previous section in high-speed flight.

Alternatively, the old airplane can also be completely preserved and simply fitted with additional ground-effect wings. In this context, the ground-effect wings can be mounted on the underside of the existing wings. As the ground-effect wings are of substantial thickness, their interior can advantageously be used as a cargo compartment.

The ground-effect vehicle according to the invention permits various operating modes. For example, it can be used exclusively on water, although this presupposes the installation of floats and a greater drive output. Amphibian operation is also possible, in which case the ground-effect vehicle can be operated from the land onto water or from water onto the land.

The land-to-land mode of operation is the most favourable in economic terms, as only one undercarriage is required and floats are only necessary for ditching. This mode of operation has the lowest fuel consumption, as the take-off run with ground effect is shorter than for airplanes. As there is no climbing flight, substantial quantities of fuel can be saved.

For the above reasons, the ground-effect vehicle according to the invention displays a very favourable mass/payload ratio because, in contrast to airplanes, comparatively far less fuel has to be carried, meaning that the payload increases equally in accordance with the weight of the quantity of fuel saved.

The invention is to be explained on the basis of the following practical examples. The drawings show the following.

Figure 1:
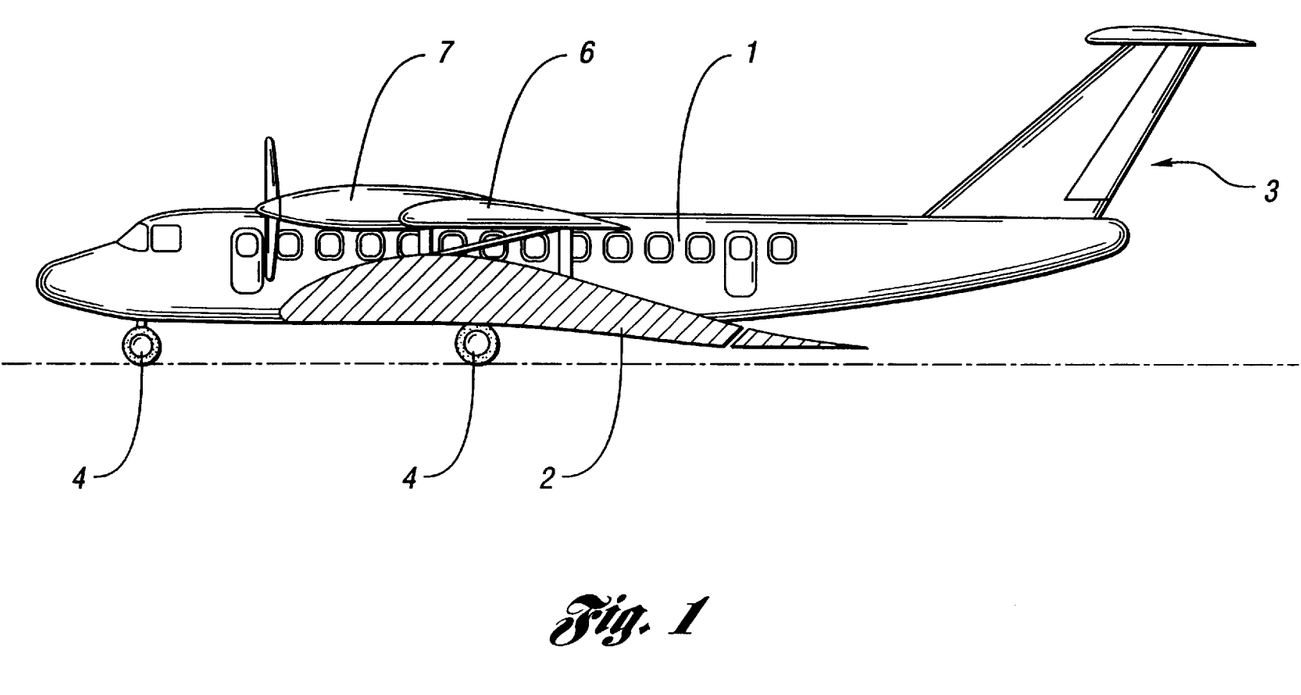
FIG. 1 A ground-effect vehicle with a normal aircraft fuselage and a ground-effect wing in a low-wing arrangement.

FIG. 1 illustrates the fundamental principle of the groundeffect vehicle, where, instead of the normal wings, ground-effect wings 2 are mounted on fuselage 1 of, an old airplane, in combination with an enlarged tail unit arrangement. Ground-effect wings 2 are designed as special slow-speed flight sections. Ground-effect wings 2 can also be mounted around the existing spar of the low-wing airplane.

In order to achieve energy-saving take-off and landing operations, the operating mode with undercarriage 4 is envisaged. The undercarriage already installed on the old airplane can be used for this purpose, and can also be combined with other types of undercarriage, such as air-cushion undercarriages and the like.

Figure 6:
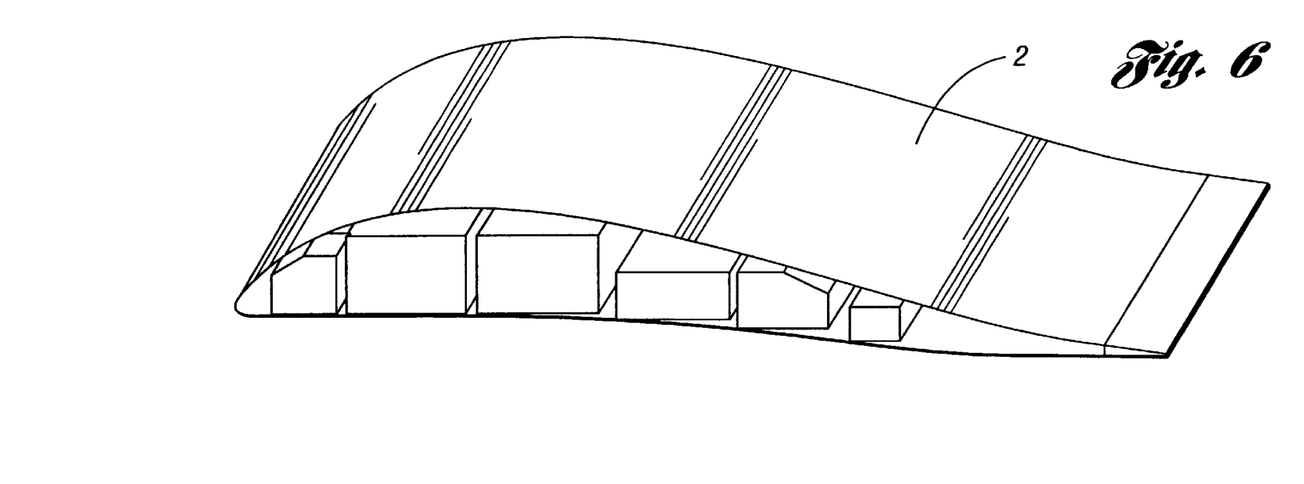
FIG. 6 A cross-section of a ground-effect wing with integrated cargo compartment.

Ground-effect wings 2 are always designed as slow-speed flight sections and display a great thickness in relation to their depth. This offers the opportunity of using the interior of ground-effect wings 2 as a cargo compartment 5 (FIG. 6), in which case, additional supporting spars are advantageous.

Figure 2:
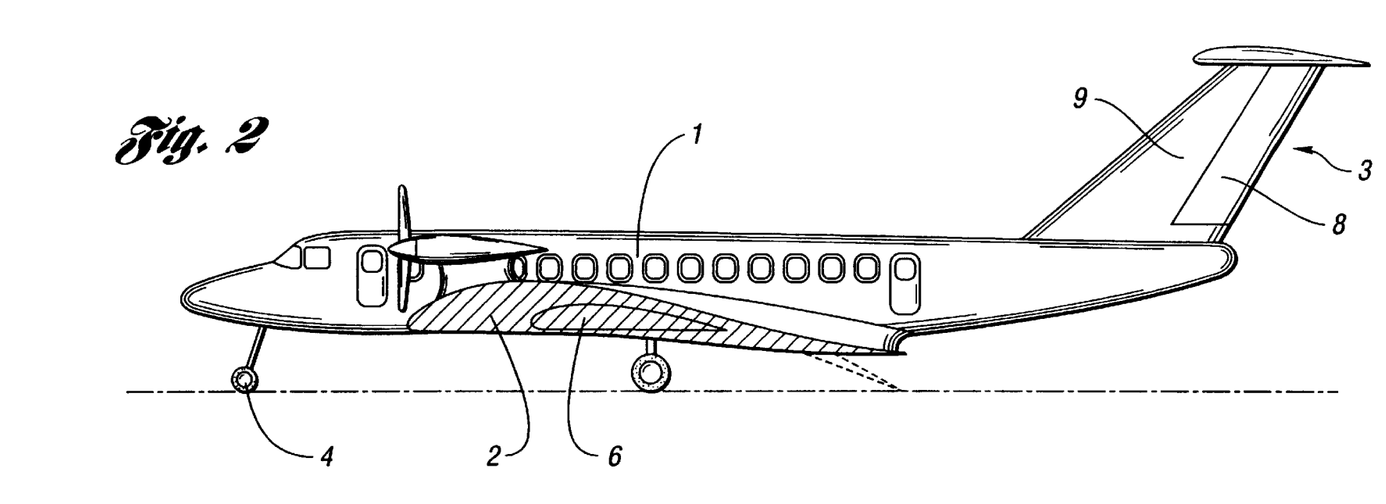
FIG. 2 A ground-effect vehicle with ground-effect wings fixed on existing wings.
Figure 3:
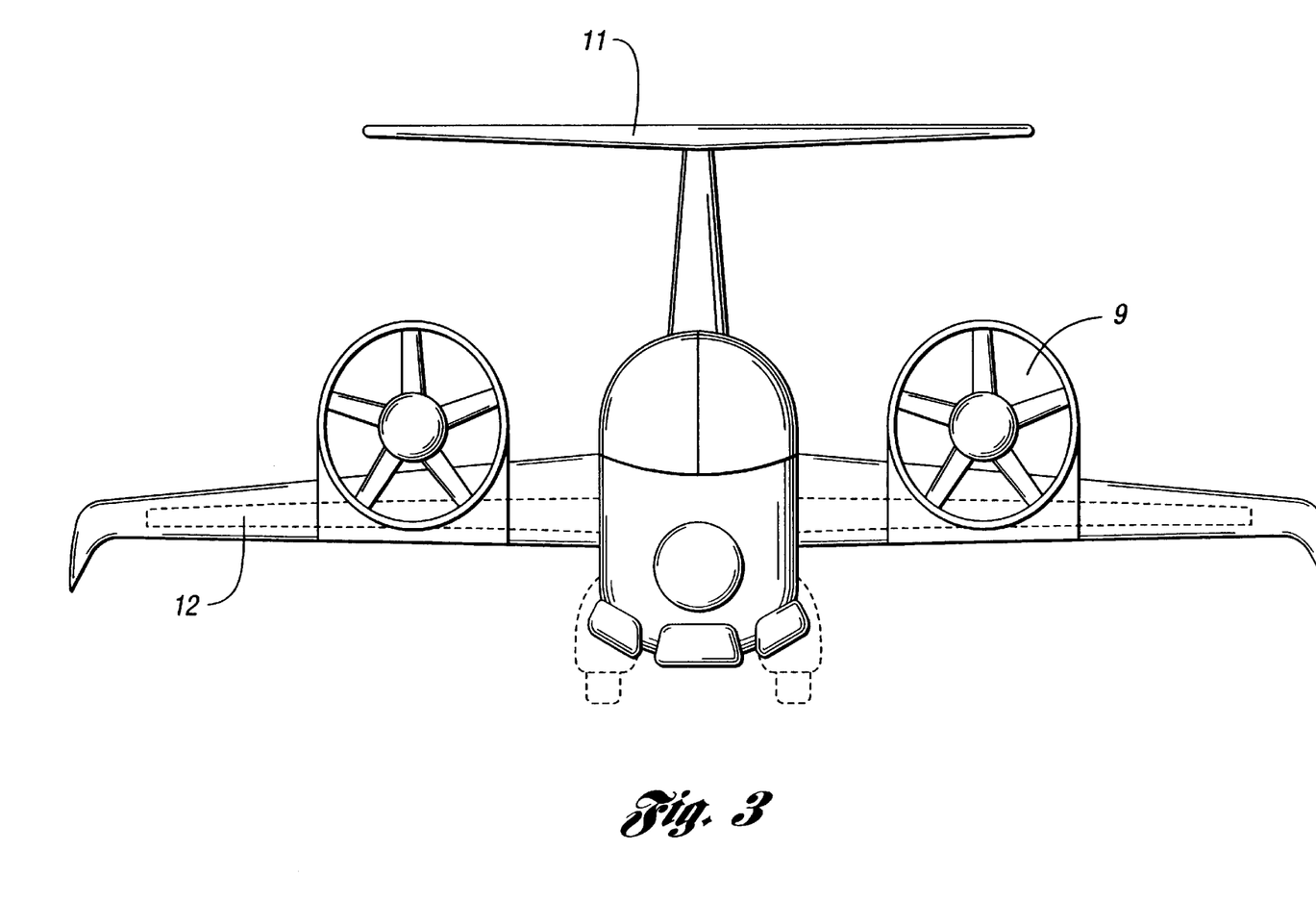
FIG. 3 The front view of a ground-effect vehicle according to FIG. 2.
Figure 3A:
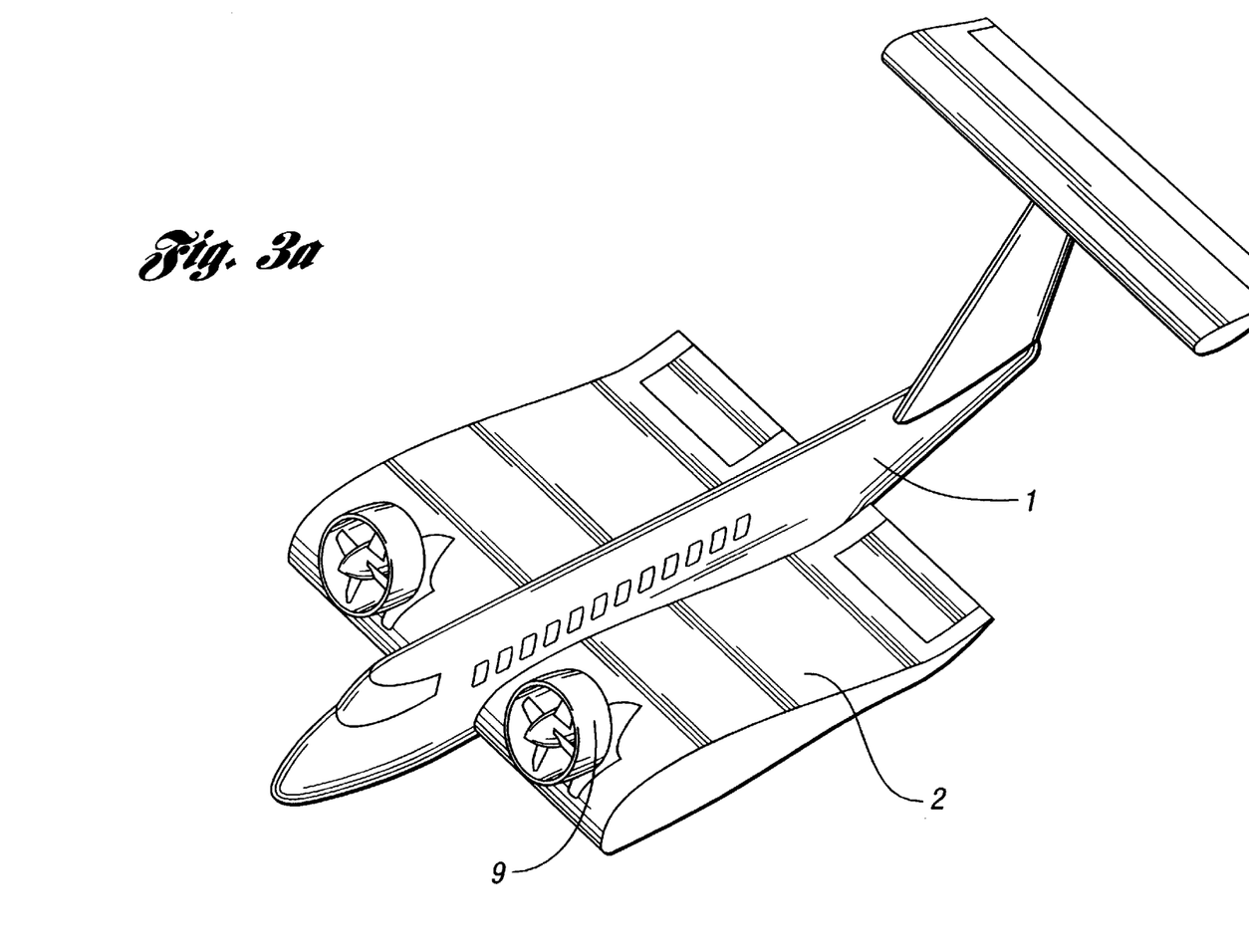
FIG. 3a The perspective view of the ground-effect vehicle according to FIG. 3.

FIG. 1 shows a ground-effect vehicle where ground-effect wings 2 are mounted below normal wings 6 of a high-wing airplane. Normal wings 6 can be shortened as stub wings and fitted with corresponding engines 7, as shown in FIG. 1. In the case of relatively large units, better control characteristics are achieved by arranging auxiliary engines directly in front of rudder unit 8. This improves the manoeuvrability of the ground-effect vehicle in slowspeed flight and on the ground. The main engines are generally designed as fan engines 9. FIGS. 2, 3 and 3a show a ground-effect vehicle where the ground-effect wings 2 are mounted around the existing main spars 12 of a low-wing airplane, or around its original wings 6.

Figure 4:
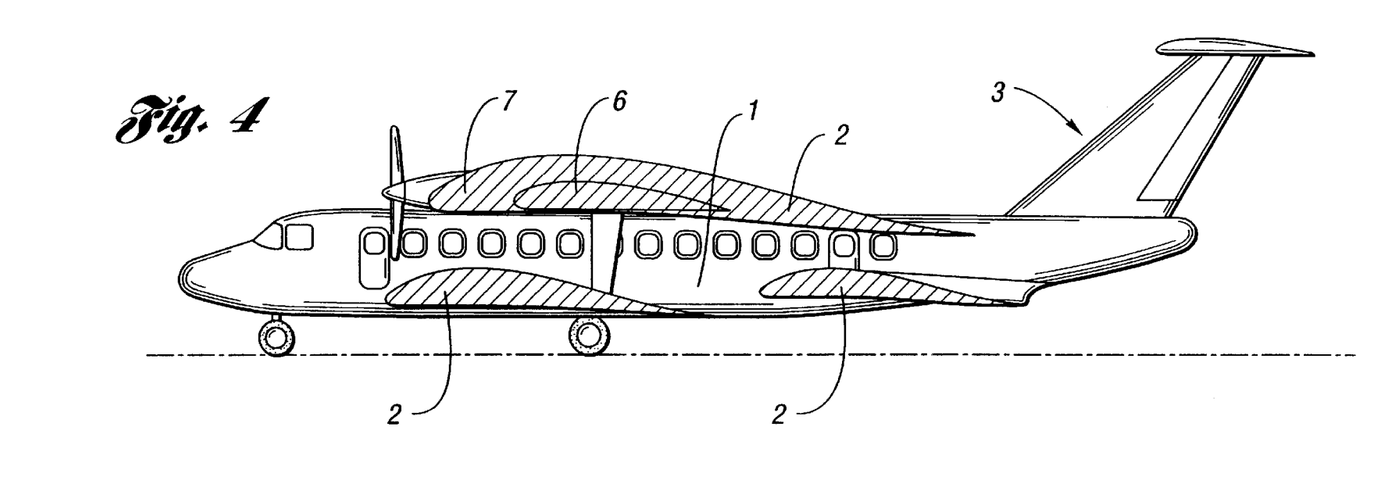
FIG. 4 A ground-effect vehicle with a high-wing airplane fuselage and with ground-effect wings mounted in the lower area of the fuselage in a tandem arrangement.

FIG. 4 shows a version of the ground-effect vehicle where engines 7 are located on the upper ground-effect wings 2, which surround the upper normal wings 6. The original wings of the old airplane fuselage can also be reutilised. Furthermore, two groundeffect wings 2 can also be additionally arranged in tandem fashion in the lower region of the side of fuselage 1, rear ground effect wing 2 simultaneously being designed as the elevator in this context.

Figure 5:
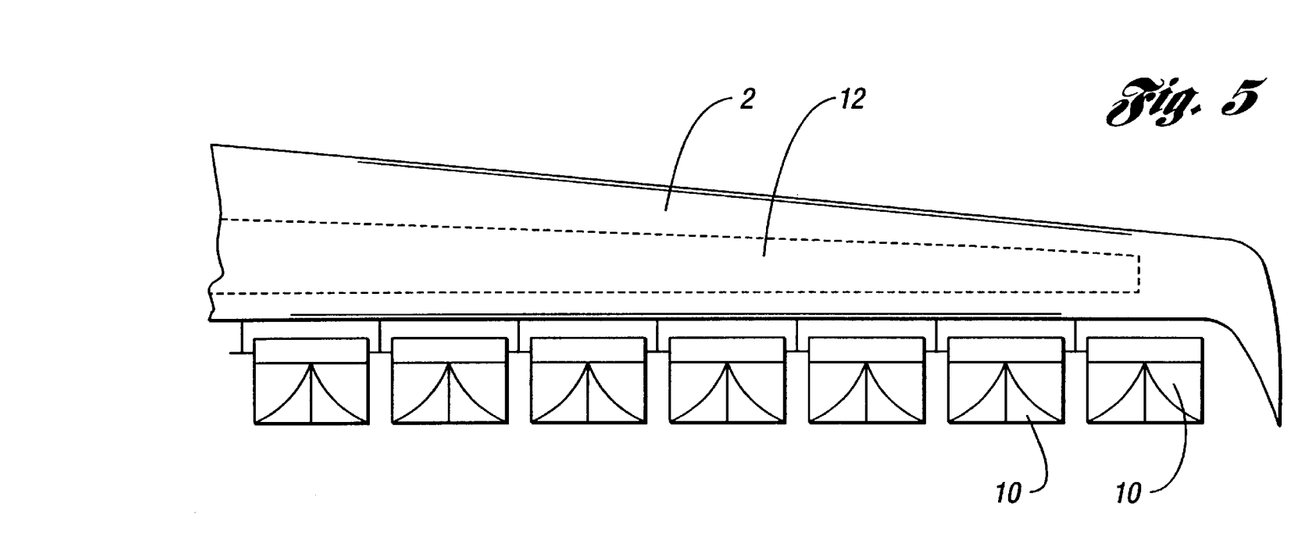
FIG. 5 The schematic representation of the arrangement of freight containers on the underside of the ground-effect wing.

In order to transport loads, the ground-effect vehicle according to the invention can include additional transport containers 10, these being suspended from the underside of ground-effect wings 2, as can be seen in FIG. 5. If the outer form of these transport containers 10 is designed in accordance with aerodynamic and hydrodynamic aspects, these transport containers 10 can even be dropped in slow-speed flight over water, for example. This configuration can be of particular advantage, for instance in military/paramilitary operations.

Figure 7:
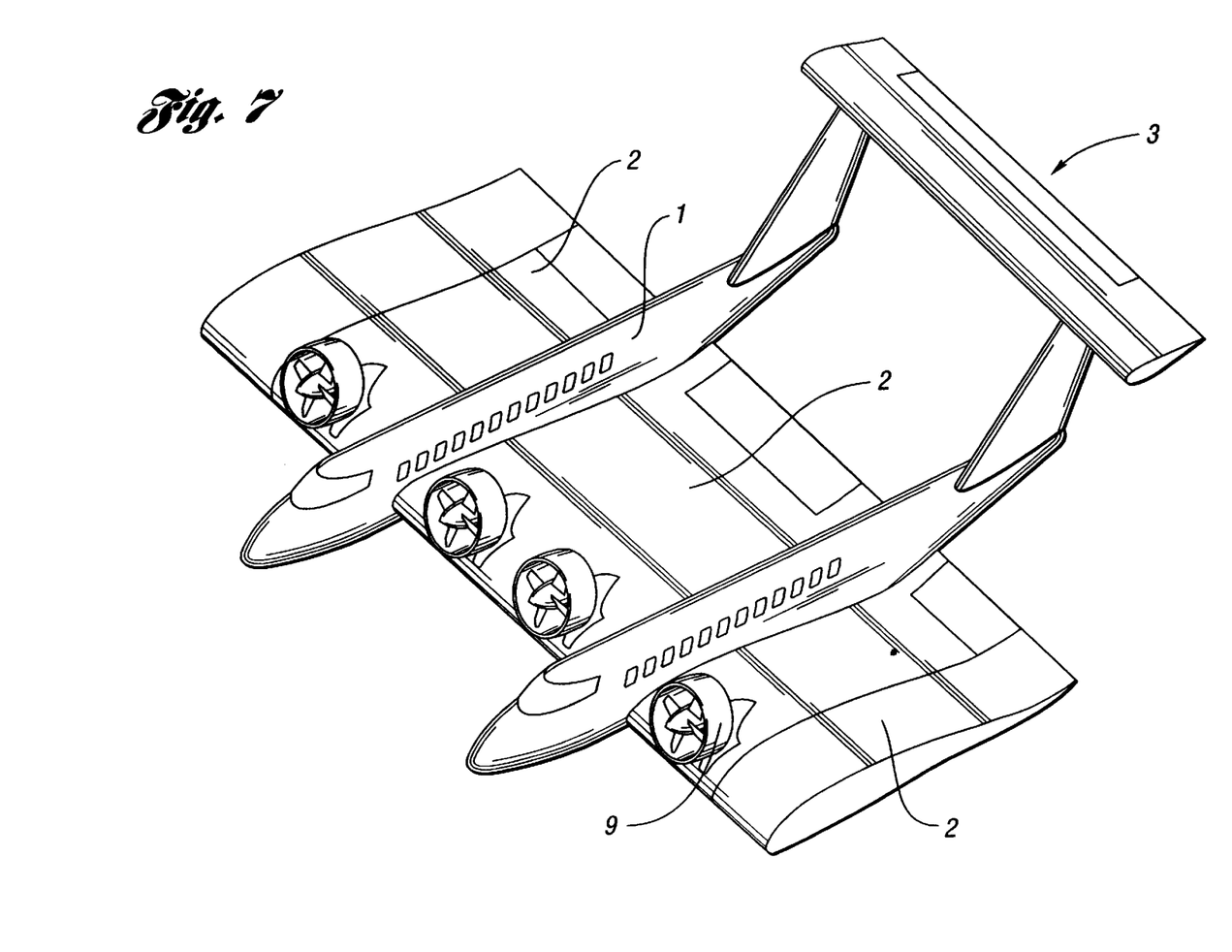
FIG. 7 A catamaran-style arrangement of two airplane fuselages with associated fan engines.
Figure 7A:
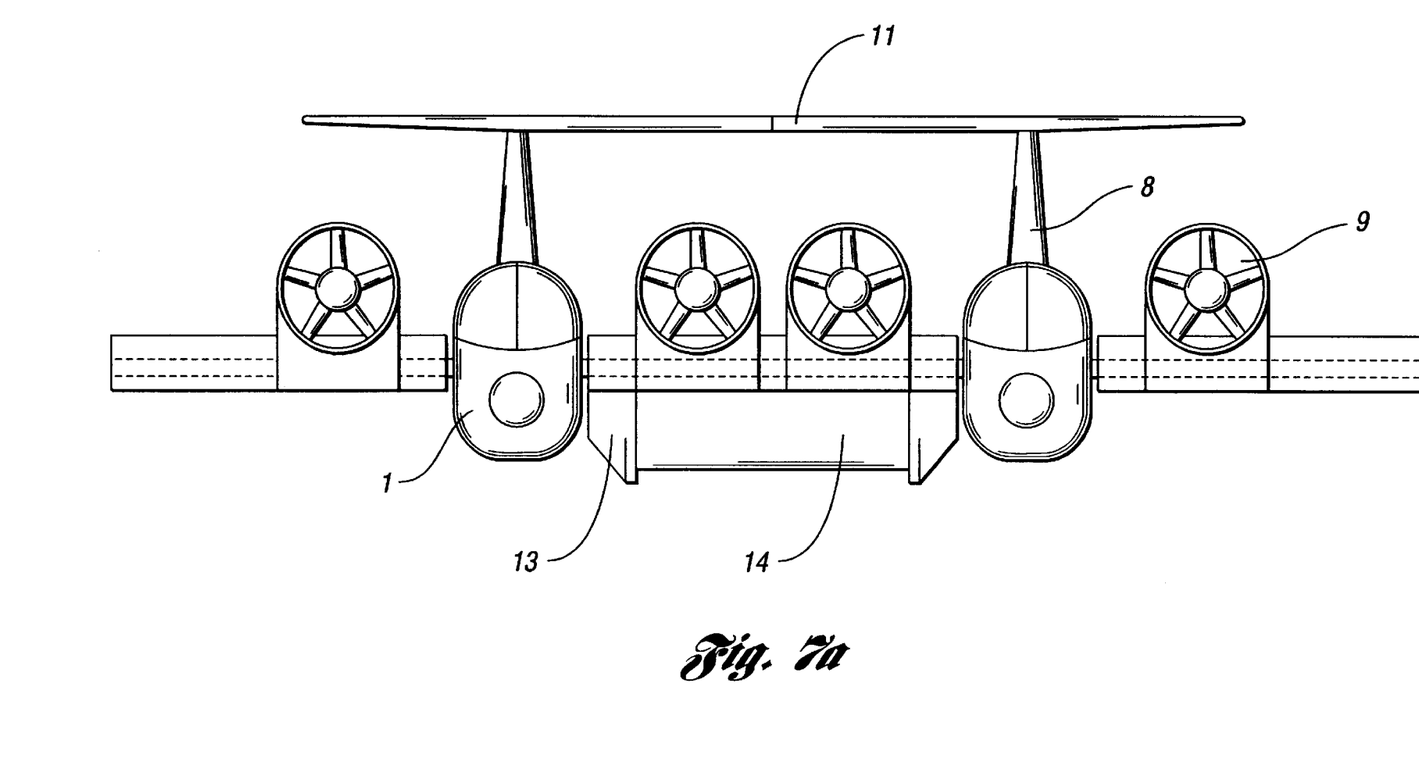
FIG. 7a The front view of the ground-effect vehicle according to FIG. 7, with an air cushion located between the fuselages.
Figure 8:
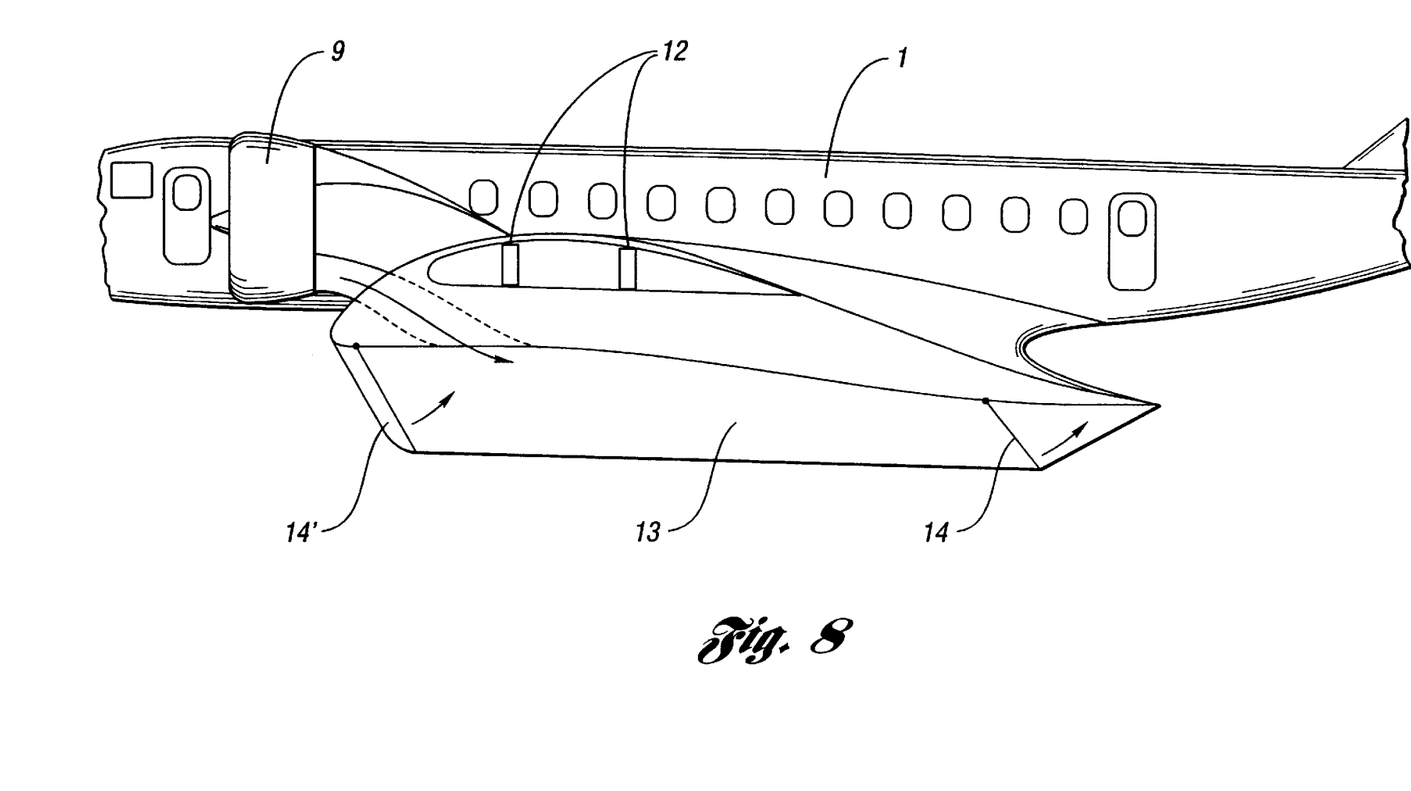
FIG. 8 A configuration of the ground-effect vehicle with an air-cushion undercarriage.

A particularly great beneficial effect is achieved by arranging two fuselages in catamaran style and connecting these by means of a ground-effect wing, as can be seen in FIGS. 7, 7a and 8. In this context, the span of the middle section of ground-effect wing 2 between fuselages 1 should be approximately one-third of the total wingspan. On the two outer sides of fuselages 1, ground-effect wings 2 continue in the same way as a ground-effect vehicle with only one fuselage 1. Rudder units 8, located on each fuselage 1, are interconnected by elevator unit 11, mounted above them.

If the ground-effect vehicles are operated in land-to-land mode, there is no need for separate floats, as it must merely be ensured that the ground-effect vehicle remains on the surface of the water in the event of ditching. Parts of ground-effect wings 2 are designed as auxiliary floats for this purpose.

In order to increase buoyancy in the event of ditching, it is also possible to provide inflatable rubber areas over the entire length of the fuselage, these being inflated by means of compressed-air tanks carried on-board.

In view of the low airspeed, it is sensible to enlarge the original rudders.

Under normal circumstances, the engine arrangement is located in the middle section of ground-effect wing 2 between fuselages 1. The propellers of fan engines 9 (open propellers can also be used) are driven directly via extended shafts by the engines, which are advantageously located in the interior of the wings.

In the event of a version predominantly operated on water, an air cushion in the style of a hovercraft or of an air-cushion vehicle with rigid side walls 13 and adjustable control flaps 14 is provided instead of the undercarriage, as is the case with surfaceeffect ships and sidewall craft. (FIGS. 7a, 8) In this case, the air cushion is created by diverting part of the air flow generated by fan engines 9. As can be seen from FIG. 7a, air-cushion undercarriage 15 is located between fuselages 1 below ground-effect wing 2.

Flaps 14 run transversely and are adjusted as a function of speed during the take-off and landing phase.

During take-off, flaps 14 remain closed until the dynamic pressure arising at front flap 14' is equal to or greater than the internal pressure in the air cushion. After this, flaps 14 are reversed (opened), so that the entire engine power is available for acceleration of the ground-effect vehicle. The valves are controlled in the corresponding reverse sequence during landing.

Figure 9:
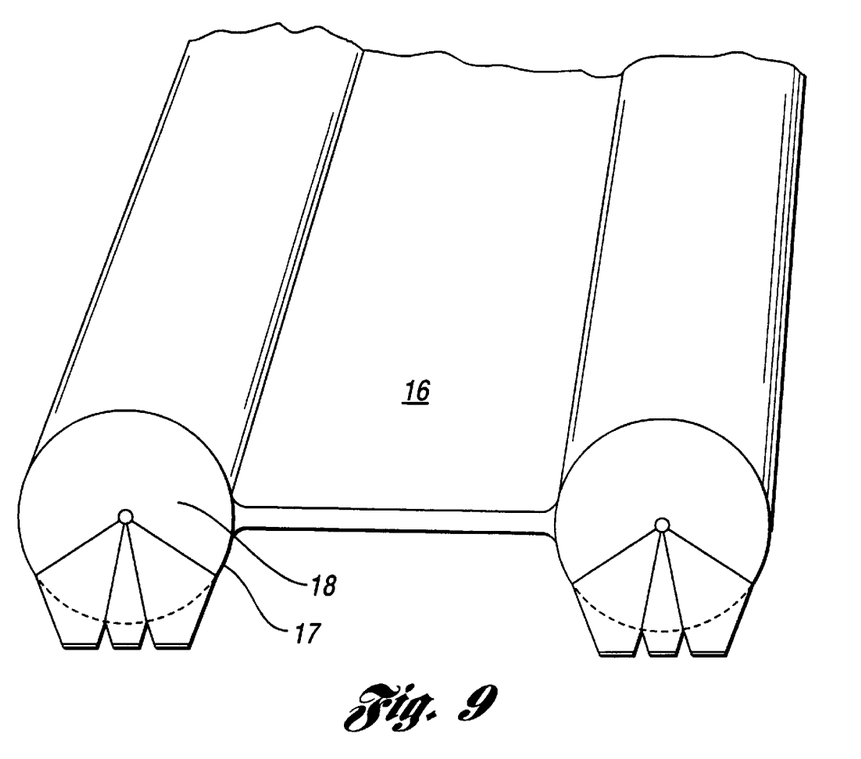
FIG. 9 A schematic representation of an inflatable raft-type undercarriage.
Figure 10:
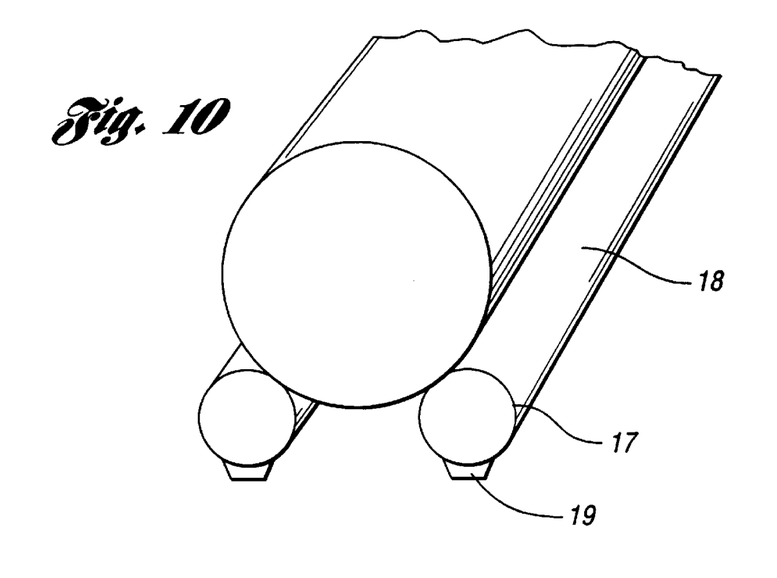
FIG. 10 A schematic representation of a round-effect vehicle with inflatable tubes as the undercarriage.

FIGS. 9 and 10 illustrate a version of the ground-effect vehicles where an inflatable raft 16, or floats similar to an inflatable raft, are mounted under fuselage 1. This inflatable raft 16 comprises two or more inflatable floats 17, containing at least one air chamber 18 or, for safety reasons, preferably several air chambers 18 filled with compressed air or another gas.

Inflatable raft 16, or at least floats 17, are made of rubber or a rubber-reinforced fabric, or of a comparable elastic, tear-proof plastic material or the like. As can be seen from FIG. 10, it is also possible to fix individual floats 17 laterally on the bottom of fuselage 1 instead of inflatable raft 16.

This type of undercarriage is equally suitable for ground-effect vehicles with one or more fuselages, and this undercarriage can be combined with a conventional, retractable wheeled undercarriage or the air-cushion undercarriage, as a result of which the groundeffect vehicle can be used under any conceivable ambient conditions and on any terrain. This universal utility allows operation of the ground-effect vehicle on water, or on partly contaminated water, on ice, on partially frozen waters or on unprepared or prepared snow or grass runways without the need for special technical provisions. In this context, the water can even contain vegetation, such as reeds, grass, seaweed, etc. Ground-effect vehicles with undercarriages of this type can even be operated without problems on roughly prepared sand runways (desert runways), or on mud runways which would not permit take-off or landing with a conventional undercarriage.

Inflatable raft 16, or individual floats 17, can advantageously be combined with the air-cushion undercarriage illustrated in FIGS. 7a and 8. In this case, floats 17 simply have to be installed instead of the rigid side walls, with flaps 14 mounted between them. This facilitates take-off considerably.

The use of inflatable raft 16 or floats 17 as the undercarriage simultaneously ensures that the necessary buoyancy volume is available in the event of ditching.

A further improvement of the undercarriage with inflatable raft 16 or floats 17 is achieved by providing additional skids 19, which are mounted longitudinally below floats 17 or firmly connected to the outer skin of floats 17. These skids 19 can be made of an elastic, fracture-resistant plastic, which should display the best possible sliding properties. The front end of these skids 19 in the direction of travel is turned up in the manner of a ski, guaranteeing good sliding on all surfaces.

This configuration has the particular advantage of permitting very good distribution of the forces acting on the undercarriage during take-off and landing and their transmission to the fuselage of the ground-effect vehicle. Furthermore, the elasticity of an undercarriage of this kind guarantees good cushioning of the jolts which inevitably occur during take-off and landing.

With ground effect, the ground-effect vehicles can achieve speeds of up to approx. 400 km/h at an altitude above water of 10 to 15% of the wingspan, the cruising speed being selectable between 120 and 400 km/h, depending on size and intended purpose.

The previously described use of old airplane fuselages is the preferred and least expensive configuration. Of course, it is also possible to construct the ground-effect vehicles from completely new assemblies.

As the ground-effect vehicles do not participate in general air traffic, the burden on existing air routes is relieved and the noise pollution in the vicinity of airports is reduced. In view of the special uplift conditions resulting from the ground effect, the engine powers can be substantially reduced. In this context, it is foreseeable that diesel engines or hydrogen propulsion systems will be used in future, which are highly favourable in ecological terms but cannot be used for airplanes owing to the large quantities of fuel required when climbing and because of the greater weight.

List of Reference Numbers

1 Fuselage
2 Ground-effect wing
3 Tail unit
4 Undercarriage
5 Cargo compartment
6 Normal wing
7 Engine
8 Rudder unit
9 Fan engine
10 Transport container
11 Elevator
12 Main spar
13 Side wall
14 Control flaps
15 Air-cushion undercarriage
16 Inflatable raft
17 Float
18 Air chamber
19 Skid

We claim:

1. Ground-effect vehicle for the rapid transport of passengers and/or freight, with at least one fuselage (1), an undercarriage and ground-effect wings (2), a tail unit (3) for directional control and a drive system for driving the vehicle, characterised in that the ground-effect vehicle consists of at least one fuselage (1) of a preflown, recycled airplane, in that the ground-effect wings (2) are fixably mounted to the ground-effect vehicle on or about either existing wings (6) of the preflown, recycled airplane or existing spars (12) of the preflown, recycled airplane, and in that the undercarriage (4; 15; 16) is provided with means to at least increase buoyancy or reduce friction during the take-off and landing phase.

2. Ground-effect as per claim 1, characterised in that the ground-effect wings (2) have a slow-speed flight section with a straight rear edge.

3. Ground effect vehicle as per claim 1, characterised in that the wings (6) display a great thickness in relation to the depth.

4. Ground-effect vehicle as per claim 2, characterised in that the wings (6) display a great thickness in relation to the depth.

5. Ground-effect vehicle as per claim 1, characterised in that the ground-effect wings (2) are mounted instead of a normal wing (6) on the preflown, recycled airplane.

6. Ground-effect vehicle as per claim 1, characterised in that the ground-effect wings (2) are mounted below the existing wings (6) of the preflown, recycled airplane, with the drive system being located on the wings (6).

7. Ground-effect vehicle as per claim 1, characterised in that two or more ground-effect wings (2) are connected to the fuselage (1) in a tandem arrangement.

8. Ground-effect vehicle as per claim 1, characterised in that two fuselages (1) are interconnected in catamaran style by ground-effect wings (2).

9. Ground-effect vehicle as per claim 8, characterised in that the rudder units (8) on a catamaran-style fuselage arrangement are interconnected by an elevator (11) mounted above them.

10. Ground-effect vehicle as per claim 8, characterised in that the drive system includes propellers and drive motors arranged at least on a middle wing section of the wings and that the propellers are driven via extended drive shafts.

11. Ground-effect vehicle as per claim 9, characterised in that the drive system includes propellers and drive motors arranged at least on a middle wing section of the wings and that the propellers are driven via extended drive shafts.

12. Ground-effect vehicle as per claim 1, characterised in that an air cushion is formed below the ground-effect vehicle between fixed side walls (13) by means of adjustable control flaps (14) by part of air flow generated by the drive system directed between the side walls (13).

13. Ground-effect vehicle as per claim 12, characterised in that the air cushion is bordered and controlled by transversely arranged, pivoting control flaps (14) on a front air inlet side and a rear air outlet side of the drive system, the transversely arranged control flaps (14) being controlled as a function of speed.

14. Ground-effect vehicle as per claim 1, characterised in that one of an inflatable raft (16) provided with floats (17), and a set of longitudinally mounted floats (17) arranged on the side of the fuselage (1) is fixed below the fuselage (1).

15. Ground-effect vehicle as per claim 14, characterised in that the one of the inflatable raft (16) and the set of floats (17) is made of a tear-proof material capable of withstanding high loads.

16. Ground-effect vehicle as per claim 14, characterised in that the underside of the floats (17) is provided with longitudinal skids (19).

17. Ground-effect vehicle as per claim 15, characterised in that the underside of the floats (17) is provided with longitudinal skids (19).

\* \* \* \* \*